(12) United States Patent
Jinbo

(10) Patent No.: US 6,870,344 B2
(45) Date of Patent: Mar. 22, 2005

(54) MOTOR CONTROL SYSTEM

(75) Inventor: Shigeo Jinbo, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/471,338

(22) PCT Filed: Oct. 3, 2001

(86) PCT No.: PCT/JP01/08713

§ 371 (c)(1),
(2), (4) Date: Sep. 10, 2003

(87) PCT Pub. No.: WO03/032480

PCT Pub. Date: Apr. 17, 2003

(65) Prior Publication Data

US 2004/0113584 A1 Jun. 17, 2004

(51) Int. Cl.$^7$ ............................................. G05B 11/36
(52) U.S. Cl. ...................... 318/609; 318/610; 318/721; 318/757
(58) Field of Search ................................ 318/609, 610, 318/727, 494, 721, 757, 767

(56) References Cited

U.S. PATENT DOCUMENTS

| | | | | |
|---|---|---|---|---|
| 5,757,161 A | * | 5/1998 | Ikkai et al. ................. | 318/719 |
| 5,814,967 A | * | 9/1998 | Garces et al. ............... | 318/807 |
| 5,963,007 A | * | 10/1999 | Toyozawa et al. .......... | 318/799 |
| 6,163,130 A | * | 12/2000 | Neko et al. ................. | 318/806 |

FOREIGN PATENT DOCUMENTS

| | | |
|---|---|---|
| JP | 6-038544 | 2/1994 |
| JP | 9-121595 | 5/1997 |

* cited by examiner

*Primary Examiner*—Rina Duda
(74) *Attorney, Agent, or Firm*—Sughrue Mion, PLLC

(57) ABSTRACT

An inverter part having a switching unit for applying a three-phase AC voltage to a motor, a lock detection unit for detecting a lock state of the motor and also generating a lock detection signal by the detection, and a current control unit for passing a d-shaft armature current id through the motor so that an absolute value of a current of a phase with the largest current flowing through the motor decreases based on the lock detection signal.

3 Claims, 4 Drawing Sheets

MOTOR CONTROL SYSTEM

TECHNICAL FIELD

The present invention relates to a motor control system, and extends a life of an inverter part by passing a d-shaft armature current through a motor at the time of a lock of the motor.

BACKGROUND ART

In a motor control system disclosed in JP-A-9-121595, a technique in which when it is detected-that a temperature of a switching element forming an inverter part increases, a frequency (hereinafter called a carrier frequency) of a carrier signal of a PWM circuit is first decreased and when the temperature increases still, control is performed so as to decrease torque of a motor and an increase in temperature of the inverter part is prevented is disclosed.

On the other hand, in a motor-driven injection molding machine, the practice of periodically opening and closing a movable metal mold driven by a motor with respect to a fixed metal mold is made. In such opening and closing, at the time of closing, the movable metal mold and the fixed metal mold are pressed and the motor becomes a lock state and at the time of opening, the movable metal mold moves and thereby the motor becomes an operation state. That is, the motor repeats the operation and lock states periodically.

In the case that a motor is in the lock state, as described in JP-A-6-38544, a magnitude and a direction of a current flowing through each phase of the motor are fixed, so that a large current flows through one particular switching element forming an inverter part. Therefore, a temperature of the one switching element increases extremely than that of the other switching element.

In such a use, as described in JP-A-9-121595, when the carrier frequency or the torque is decreased after detecting that the temperature of the switching element forming the inverter part increases, there was a problem that power loss of all the switching elements decreases uniformly and it is not efficient and variations in power loss occurring in each the switching element are large.

In addition, when the carrier frequency is decreased, a ripple current of the motor increases and noise generated from the motor increases. When the torque is decreased, there was a problem that torque generated from the motor becomes improper with respect to a drive load.

The present invention is implemented to solve the problems, and an object of the invention is to provide a motor control system for making power loss of each switching element of an inverter part as uniform as possible by passing a d-shaft armature current $i_d$ through a motor at the time of a lock in a use in which the motor is locked.

DISCLOSURE OF THE INVENTION

A motor control system according to a first invention is characterized by comprising an inverter part having switching means for applying a three-phase AC voltage to a motor, lock detection means for detecting a lock state of the motor and also generating a lock detection signal by the detection, and current control means for passing a d-shaft armature current $i_d$ through the motor so that an absolute value of a current of a phase with the largest current flowing through the motor decreases based on the lock detection signal.

According to such a motor control system, the current control means passes a d-shaft armature current $i_d$ through the motor so as to decrease an absolute value of a current of a phase with the largest current flowing through the motor by the lock detection signal. Therefore, even in the case that the motor is in the lock state, there is an effect capable of suppressing noise generated from the motor without remarkably shortening a life of the particular switching means forming the inverter part.

In the first invention, it is characterized in that the current control means of a motor control system according to a second invention passes a d-shaft armature current $i_d$ through the motor so that absolute values of currents of two phases are larger than that of the other one phase among three phases whose the currents flow through the motor are made substantially equal.

According to such a motor control system, the current control means passes a d-shaft armature current through the motor so that absolute values of currents of two phases are larger than that of the other one phase among three phases whose the currents flow through the motor are made substantially equal and thereby, even in the case that the motor is in the lock state, a large current does not flow through a particular phase of the motor furthermore. Therefore, there is an effect that a life of the particular switching means forming the inverter part is not shortened furthermore.

In the first or second invention, it is characterized in that the current control means of a motor control system according to a third invention satisfies the following A when it is assumed that a q-shaft armature current passed through the motor is $I_q$ and a magnetic pole position of the motor is $\theta_r$.

$$I_d = A I_q$$

where $A = \tan(\theta_r - \pi \cdot n/3)$ n=0 for $0° < \theta_r \leq 30°$, $330° < \theta_r \leq 360°$, n=1 for $0° < \theta_r \leq 90°$, n=2 for $90° < \theta_r \leq 150°$, n=3 for $150° < \theta_r \leq 210°$, n=4 for $210° < \theta_r \leq 270°$, n=5 for $270° < \theta_r \leq 330°$ According to such a motor control system, the current control means passes a d-shaft armature current $i_d$ so as to satisfy the above A, so that an angle at which a magnetic pole position of the motor is shifted equivalently becomes a maximum of 30°. Therefore, the necessary d-shaft armature current $i_d$ to be passed through the motor can be suppressed, so that there is an effect capable of suppressing the maximum value of a current flowing through each phase of the motor.

BEST MODE FOR CARRYING OUT THE INVENTION

First Embodiment

Figure 1:
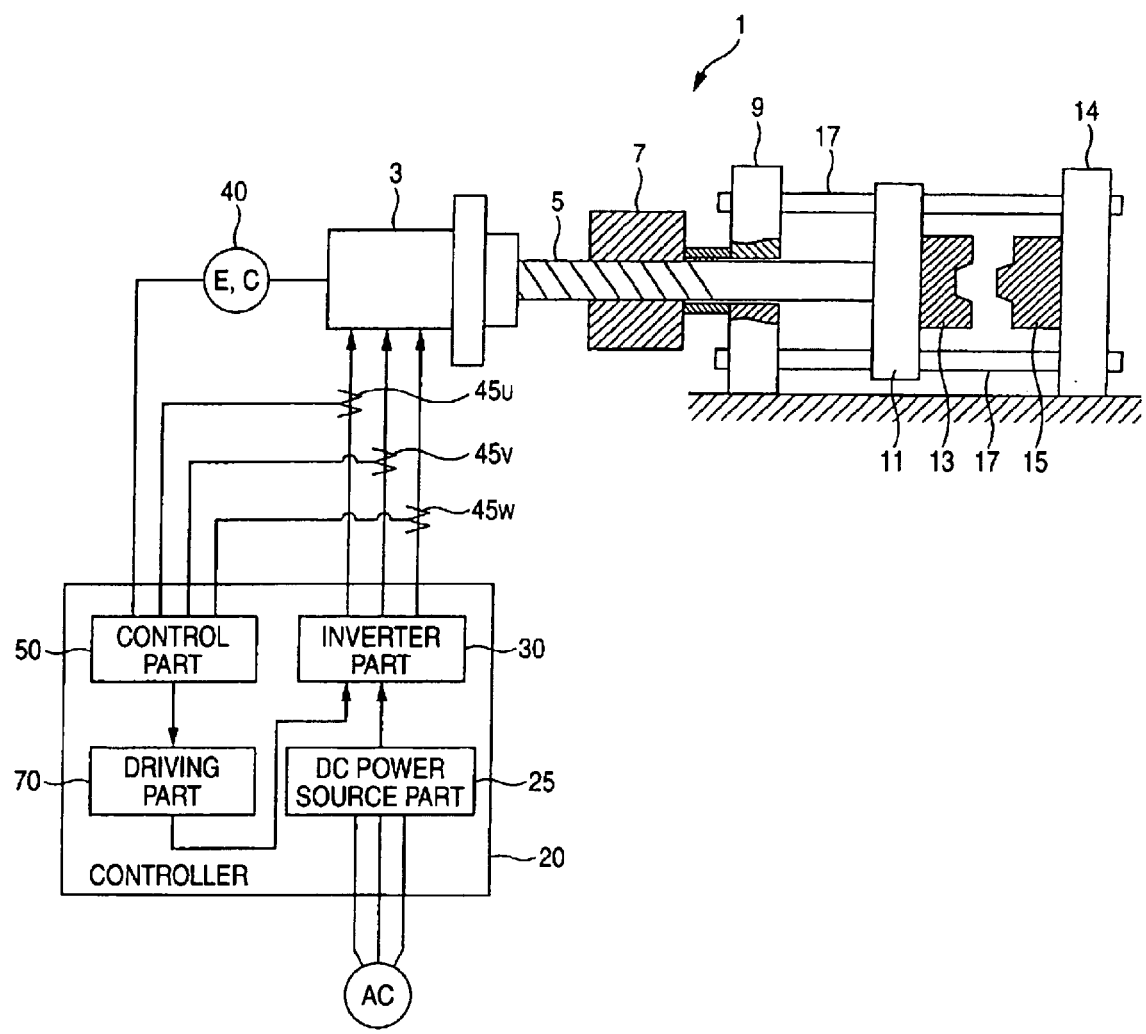
FIG. 1 is a front view applying a motor control system according to one embodiment of the present invention to a motor-driven injection molding machine.
Figure 2:
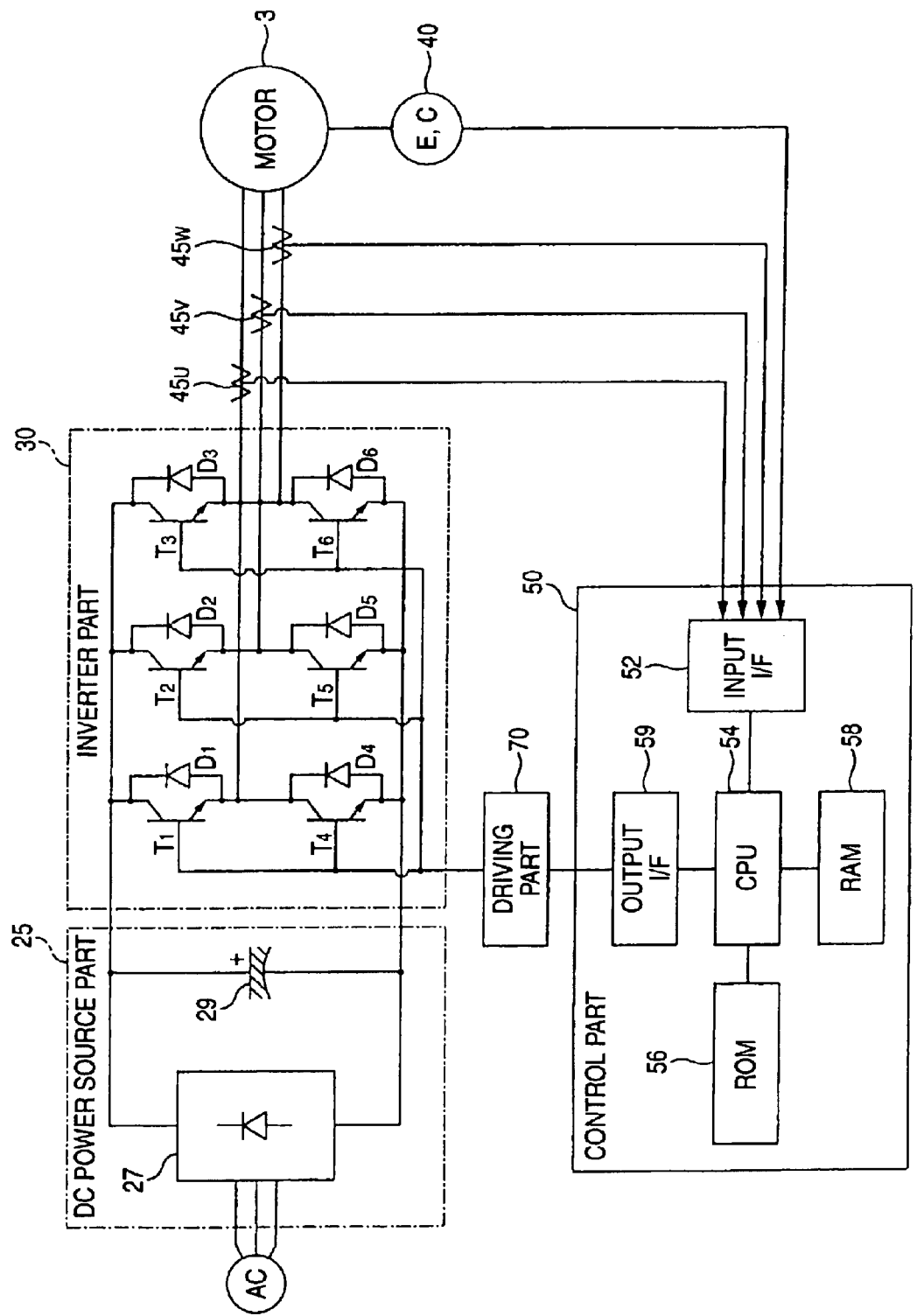
FIG. 2 is the entire configuration diagram of the motor control system according to one embodiment.
Figure 3:
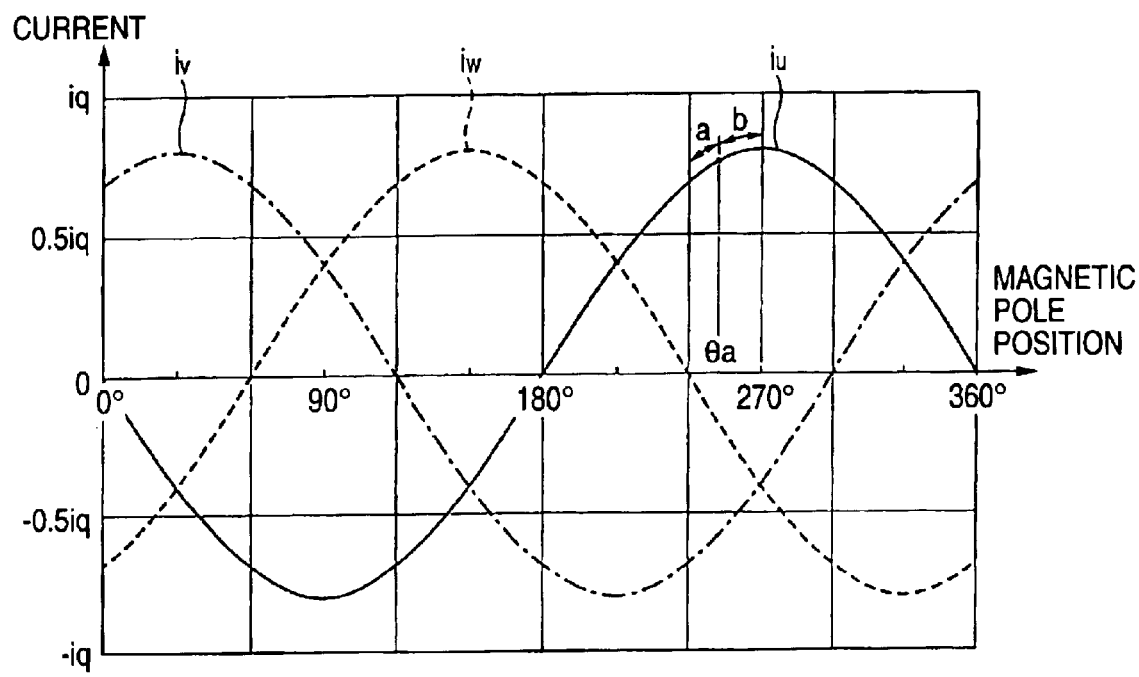
FIG. 3 is a current waveform chart flowing through each phase of a motor shown in FIG. 1.

Next, a motor control system according to one embodiment of the present invention will be described by FIGS. 1 to 3. FIG. 1 is a front view applying the motor control system according to one embodiment to a motor-driven injection molding machine, and FIG. 2 is the entire configuration diagram of the motor control system shown in FIG. 1, and FIG. 3 is a current waveform chart flowing through each phase of a motor shown in FIG. 1.

In FIG. 1, a metal mold opening and closing apparatus 1 of the motor-driven injection molding machine comprises a nut 7 mounted in an end plate 9 while being screwed to a screw shaft 5 rotated by rotation of a three-phase permanent magnet synchronous type motor (hereinafter called a motor) 3 driven and controlled by a controller, a movable metal mold 13 fixed through a movable platen 11 fixed in the top of the screw shaft 5, a fixed metal mold 15 fixed in a fixed platen 14, and bars 17 for guiding the movable platen 11 while being fixed in the end plate 9 and the fixed platen 14, and an encoder 40 for detecting a rotational angle is provided in a shaft of the motor 3, and it is constructed so that detection parts of Hall element type current sensors 45u, 45v, 45w detect currents flowing through a U phase, a V phase, a W phase of the motor 3 by extending through output lines of a controller 20.

The controller 20 comprises a DC power source part 25 for converting an AC power source into a DC power source, a three-phase inverter part 30 for converting a DC voltage of the DC power source part 25 into an AC voltage of a variable voltage variable frequency and also driving the motor 3, a control part 50 for driving the inverter part 30 based on detection values of the current sensors 45u, 45v, 45w, and a driving part 70 for amplifying an output of the control part 50.

The DC power source part 25 comprises a converter 27 for converting a three-phase AC voltage into a DC voltage and a capacitor 29 for smoothing a ripple of the DC voltage, and the inverter part 30 comprises transistors $T_1$, $T_2$, $T_3$ forming upper side U phase, V phase, W phase acting as switching means provided in the upper side, transistors $T_4$, $T_5$, $T_6$ forming lower side U phase, V phase, W phase acting as switching means provided in the lower side, diodes $D_1$, $D_2$, $D_3$ respectively connected in parallel with the transistors $T_1$, $T_2$, $T_3$, and diodes $D_4$, $D_5$, $D_6$ respectively connected in parallel with the transistors $T_4$, $T_5$, $T_6$.

An input I/F 52 for capturing detection values of the encoder 40 and the current sensors 45u, 45v, 45w, a CPU 54, ROM 56, RAM 58 acting as storage means, and an output I/F 59 are built into the control part 50. A control program to be executed by the CPU 54, that is, a program corresponding to a flowchart of FIG. 3 described below is stored in the ROM 56, and the RAM 58 is formed so as to provide a working area to the CPU 54. When $i_{da}=i_d$, $i_{qa}=i_q$, $\theta_{re}=\theta_r$, $i_{ua}=i_u$, $i_{va}=i_v$ are used in "Practice of theory and design of AC servo system", fourth edition, General electronic publishing company, written and edited by Hidehiko Sugimoto, page 79, expression (4.11), the following expression is obtained.

$$\begin{bmatrix} i_d \\ i_q \end{bmatrix} = \sqrt{2} \begin{bmatrix} \sin(\theta_r + \pi/3)\sin\theta_r \\ \cos(\theta_r + \pi/3)\cos\theta_r \end{bmatrix} \begin{bmatrix} i_u \\ i_v \end{bmatrix} \quad (1)$$

where $i_d$: d-shaft armature current, $i_q$: q-shaft armature current, $\theta_r$: magnetic pole position The following expression is obtained from this expression (1).

$$\sqrt{2}\{i_u \sin(\theta_r+\pi/3)+i_v \sin \theta_r\}=i_d \quad (2)$$

$$\sqrt{2}\{i_u \cos(\theta_r+\pi/3)+i_v \cos \theta_r\}=i_q \quad (3)$$

The following expression is obtained from the expressions (2) and (3).

$$i_u=i_0 \cdot \sin\{\theta_r-\tan^{-1}(|i_d|/|i_q|)\} \quad (4)$$

$$i_v=i_0 \cdot \sin\{\theta_r-\tan^{-1}(|i_d|/|i_q|)+4\pi/3\} \quad (5)$$

Also, from $i_w=-i_u-i_v$, $$i_w=i_0 \cdot \sin\{\theta_r-\tan^{-1}(|i_d|/|i_q|)+2\pi/3\} \quad (6)$$

where $i_0=-\sqrt{2/3}(i_d^2+i_q^2)^{1/2}$

In each phase current $i_u$, $i_v$, $i_w$ flowing through the motor 3 of the expressions (4) to (6), at the normal time, from the viewpoint of improving efficiency of the motor 3, the motor 3 is driven and controlled with a d-shaft armature current $i_d$ set to zero. Current waveforms of the phase currents $i_u$, $i_v$, $i_w$ of the case of setting the d-shaft armature current $i_d$ to zero are shown in FIG. 3.

After detecting that the motor 3 is locked, a magnetic pole position $\theta_r$ of a rotor of the motor 3 is changed equivalently by changing $[\tan^{-1}(|i_d|/|i_q|)]$ in the expressions (4) to (6) by passing the d-shaft armature current $I_d$ through the motor 3 while maintaining a value of a q-shaft armature current $I_q$ so that absolute values of currents of two phases are larger than that of the other one phase among three phases whose the currents flow through the motor 3 become substantially equal. As a result of this, the flow of a large current through a particular phase is suppressed at the time of the lock of the motor 3.

However, the passage of the d-shaft armature current $I_d$ through the motor 3 increases the maximum value $i_0$ of each the phase current $i_u$, $i_v$, $i_w$ as is evident from the expressions (4) to (6), so that there is a need to pass the minimum necessary d-shaft armature current $I_d$.

Such a minimum necessary d-shaft armature current $I_d$ is obtained as follows. First, when the d-shaft armature current $I_d$ to be passed through the motor 3 is grasped as a relation with the q-shaft armature current $I_q$ and a current ratio is set to A, it can be expressed as $A=|i_d|/|i_q|$, so that the following expression holds.

$$|i_d|=A|i_q| \quad (7)$$

When this expression (7) is substituted into the expression (4), the following expression is obtained.

$$i_u' = -\sqrt{2/3}\, i_q(A^2+1)^{1/2} \cdot \sin(\theta_r - \tan^{-1} A) \quad (8)$$
$$= Bi_q \cdot \sin(\theta_r - \tan^{-1} A)$$

In like manner, when the expression (7) is substituted into the expressions (5) and (6), the following expressions are obtained.

$$i_v'=Bi_q \cdot \sin\{(\theta_r-\tan^{-1}A)+4\pi/3\} \quad (9)$$

$$i_w'=Bi_q \cdot \sin\{(\theta_r-\tan^{-1}A)+2\pi/3\} \quad (10)$$

where $B=-\sqrt{2/3}(A^2+1)^{1/2}$

In the case that the motor 3 is in the lock state, the d-shaft armature current $I_d$ is passed so as to shift the magnetic pole position $\theta_r$ equivalently so that two phase currents become equal in a direction of decreasing an absolute value of a current of a phase having the largest current among each of the phase currents $i_u$, $i_v$, $i_w$. Therefore, in FIG. 3, the following expression is obtained from the expressions (8) to

(10) in order to shift the magnetic pole position $\theta_r$ of the motor 3 to 0, $\pi/3$, $2\pi/3$, $\pi(3\pi/3)$, $4\pi/3$, $5\pi/3$ equivalently.

$$(\theta_r - \tan^{-1}A) = \pi \cdot n/3 \quad (11)$$

where n: phase factor, any value of 0, 1, 2, 3, 4, 5

Here, in FIG. 3, in the case of locking in a magnetic pole position $\theta_a$ of the rotor of the motor 3, 240° or 300° resides in the vicinity of the magnetic pole position $\theta_a$ to shift the magnetic pole position $\theta_r$ equivalently so that two phase currents become equal. However, in the case of shifting the magnetic pole position $\theta_r$ to 300° equivalently in a direction b in which an absolute value of a current increases, the d-shaft armature current $i_d$ becomes large, so that it is constructed so as to shift the magnetic pole position $\theta_r$ to 240° equivalently in a direction a of decreasing an absolute value of a current of a phase.

Therefore, it is constructed so that the d-shaft armature current $i_d$ to be passed through the motor 3 does not become large unduly by setting the equivalent maximum shift angle of the magnetic pole position $\theta_r$ of the rotor to 30°.

From the expression (11), the current ratio A is shown as the following expression.

$$A = \tan(\theta_r - \pi \cdot n/3) \quad (12)$$

Here, in the case of locking when the magnetic pole position $\theta_r$ of the rotor is $0° < \theta_r \leq 30°$, $330° < \theta_r \leq 360°$, it is constructed so as to be set to a phase factor n=0 and equivalently shift the magnetic pole positions $\theta_r$ (hereinafter called a phase) of the currents $i_u$, $i_v$ to 0.

Similarly, for $30° < \theta_r \leq 90°$, phases of the currents $i_u$, $i_v$ are shifted to $\pi/3$, so that it becomes the phase factor n=1, and for $90° < \theta_r \leq 150°$, phases of the currents $i_u$, $i_w$ are shifted to $2\pi/3$, so that it becomes the phase factor n=2.

Similarly, for $50° < \theta_r \leq 210°$, phases of the currents $i_w$, $i_v$ are shifted to $\pi$, so that it becomes the phase factor n=3, and for $210° < \theta_r \leq 270°$, phases of the currents $i_u$, $i_v$ are shifted to $4\pi/3$, so that it becomes the phase factor n=4.

Similarly, for $270° < \theta_r \leq 330°$, phases of the currents $i_u$, $i_w$ are shifted to $5\pi/3$, so that it becomes the phase factor n=5.

However, when the magnetic pole position $\theta_r$ of the rotor is 30°, 90°, 150°, 210°, 270°, 330°, since currents flowing through two phases of the motor 3 are equal, there is no need to pass the d-shaft armature current $I_d$, so that it becomes the d-shaft armature current $I_d=0$.

On the other hand, torque $T_e$ occurring in the motor 3 is shown as the following expression when $\Phi_{fa} = \Phi_f$, $i_{qa} = i_q$ are used in page 20, expression (2.23) of the above-mentioned literature.

$$T_e = p\Phi_f i_q \quad (13)$$

where p: the number of pole pairs, $\Phi_f$: the number of armature winding linkage magnetic fluxes (Wb)

From the expression (13), the torque does not change even in the case of passing the d-shaft armature current $i_d$.

Here, for example, when it is assumed that it is locked in the case that the magnetic pole position $\theta_r$ of the rotor of the motor 3 is in the range of $240° < \theta_r \leq 270°$, for example, the magnetic pole position $\theta_r$ is 260° (4.54 rad), the positive number n is obtained from the above and the current ratio A is shown as the following expression from the expression (11).

$$A = \tan(4.54 - 4\pi/3) = 0.38$$

Therefore, a U phase current $i_u'$ which passes the d-shaft armature current $i_d$ is shown as the following expression from the expression (8).

$$i_u' = -\sqrt{2/3} i_q (0.38^2 + 1)^{1/2} \cdot \sin(4\pi/3)$$

$$i_u' = -\sqrt{2/3} i_q \cdot 1.07 \cdot -0.866 = 0.75 i_q$$

On the other hand, a U phase current $i_u$ which does not pass the d-shaft armature current $i_d$ is shown as the following expression by being set to the d-shaft armature current $i_d=0$ in the expression (4).

$$i_u = -\sqrt{2/3} \, i_q \cdot \sin(\theta_r - \tan^{-1} 0) \quad (14)$$

$$= -\sqrt{2/3} \, i_q \cdot \sin 260° = 0.80 \, i_q$$

On the other hand, lives of the transistors $T_1$ to $T_6$ are proportional to the biquadrate of a temperature rise $\Delta Tj$ in junction parts of the transistors $T_1$ to $T_6$, and the temperature rise $\Delta Tj$ of each of the transistors $T_1$ to $T_6$ is proportional to currents flowing through the transistors $T_1$ to $T_6$.

In the case of locking in the magnetic pole position $\theta_r$ of the motor 3, the life of the transistor $T_1$ with the largest current flowing among the transistors $T_1$ to $T_6$ is extended in proportion to the biquadrate of a ratio K between the U phase current $i_u'$ of the case of passing the d-shaft armature current $i_d$ and the U phase current $i_u$ of the case of setting the d-shaft armature current $i_d$ to zero. When this is estimated by the above-mentioned example, the life of the transistor $T_1$ is extended 1.31 times as described below.

$$K = (i_u/i_u')^4 = (0.80 i_q/0.75 i_q)^4 = 1.31$$

Incidentally, a current of each the phase current $i_v$ increases inversely by passing the d-shaft armature current $i_d$, but a life of only a particular transistor among the transistors $T_1$ to $T_6$ is not shortened.

Figure 4:
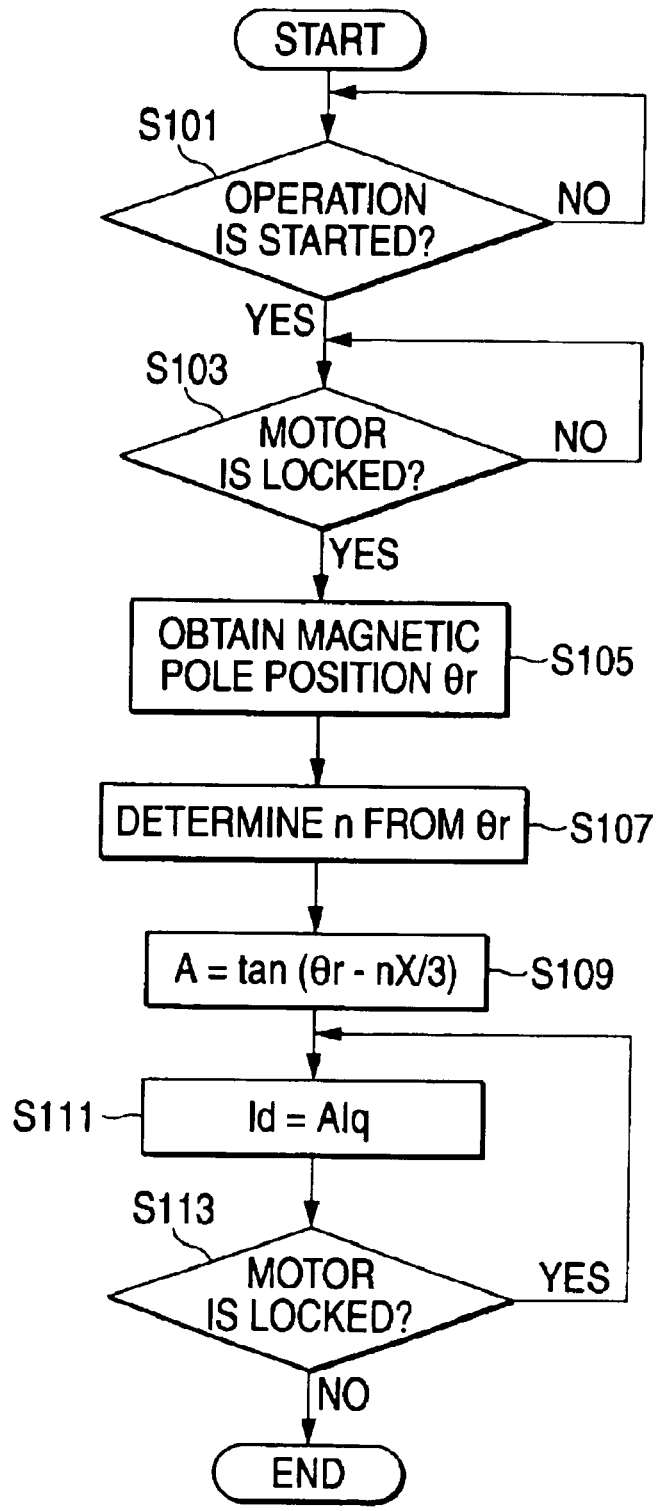
FIG. 4 is a flowchart showing an action of the motor control system shown in FIG. 1.

An action of the motor control system configured as described above will be described by FIGS. 1 to 4. FIG. 4 is a flowchart showing an action of the motor control system shown in FIG. 1.

Now, when an operation start command is inputted to the control part 50, the CPU 54 detects this operation start command (step S101), and a three-phase AC voltage is applied to the motor 3 from the inverter part 30, and the motor 3 is rotated as the d-shaft armature current $i_d=0$, and the movable metal mold 13 coupled to a ball screw 5 moves in the right direction to abut on the fixed metal mold 15 and the motor 3 is locked. The CPU 54 detects a rotational angle $\Theta$ of the motor 3 through the input I/F 52 by the encoder 40 acting as rotational angle detection means and in the case of detecting that there is no change in the rotational angle $\Theta$ by a predetermined angle for predetermined time (lock detection means), it is decided that the motor 3 is locked and a lock detection signal is generated (step S103), and the rotational angle $\Theta$ of the motor 3 of the encoder 40 is read, and the magnetic pole position $\theta_r$ of the motor 3 is calculated and obtained by the number of pole pairs of the angle $\Theta \times$ the motor 3 (step S105).

The CPU 54 obtains n of the expression (8) from the magnetic pole position $\theta_r$ (step S107), and obtains the current ratio A from $A = \tan(\theta_r - \pi \cdot n/3)$ as shown in the expression (12) (step S109), and obtains the d-shaft armature current $I_d$ from $I_d = AI_q$ as shown in the above and also passes the d-shaft armature current $I_d$ through the motor 3 from the inverter part 30. That is, it is controlled so as to pass the d-shaft armature current $i_d$ through the motor 3 so that absolute values of currents of two phases are larger than that of the other one phase among three phases whose the currents flow through the motor 3 are made substantially equal (step S111). As a result of this, even in the case that the motor 3 is in the lock state, a large current does not flow through a particular phase of the motor 3 and currents of particular transistors $T_1$ to $T_6$ do not increase and a life of the inverter part 30 extends.

Industrial Applicability

As described above, a motor control system according to the present invention is suitable for use in, for example, a motor-driven injection molding machine.

What is claimed is:

1. A motor control system characterized by comprising:

an inverter part having switching means for applying a three-phase AC voltage to a motor, lock detection means for detecting a lock state of the motor and also generating a lock detection signal by the detection, and current control means for increasing of decreasing a d-shaft armature current $i_d$ through the motor while maintaining a q-shaft armature current constant so that an absolute value of a current of a phase with the largest current flowing through the motor decreases based on the lock detection signal.

2. A motor control system as defined in claim 1, characterized in that the current control means passes a d-shaft armature current $i_d$ through the motor so that absolute values of currents of two phases are larger than that of the other one phase among three phases whose the currents flow through the motor are made substantially equal.

3. A motor control system as defined in claim 1 or 2, characterized in that the current control means satisfies the following A when it is assumed that a q-shaft armature current passed through the motor is $I_q$ and a magnetic pole position of a rotor of the motor is $\theta_r$ $$I_d = A I_q$$

where $A = \tan(\theta_r - \pi \cdot n/3)$
where n=0 for $0° < \theta_r \leq 30°$, $330° < \theta_r \leq 360°$,
n=1 for $30° < \theta_r \leq 90°$, n=2 for $90° < \theta_r \leq 150°$,
n=3 for $150° < \theta_r \leq 210°$, n=4 for $210° < \theta_r \leq 270°$,
n=5 for $270° < \theta_r \leq 330°$.

* * * * *

UNITED STATES PATENT AND TRADEMARK OFFICE
CERTIFICATE OF CORRECTION

PATENT NO. : 6,870,344 B2
DATED : March 22, 2005
INVENTOR(S) : Shigeo Jinbo

It is certified that error appears in the above-identified patent and that said Letters Patent is hereby corrected as shown below:

<u>Column 2,</u>
Line 36, delete "n=1 for $0°<\theta_r\leq90°$, n=2 for $90°<\theta_r\leq150°$" and insert -- n=1 for $30°<\theta_r\leq90°$, n=2 for $90°<\theta_r\leq150°$ --.

Signed and Sealed this

Thirteenth Day of September, 2005

JON W. DUDAS
*Director of the United States Patent and Trademark Office*